US008848278B2

(12) United States Patent
Pilossof

(10) Patent No.: US 8,848,278 B2
(45) Date of Patent: *Sep. 30, 2014

(54) ASYMMETRICAL DEFORMABLE DIFFRACTIVE GRATING MODULATOR

(71) Applicant: Nissim Pilossof, Burnaby (CA)

(72) Inventor: Nissim Pilossof, Burnaby (CA)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/737,983

(22) Filed: Jan. 10, 2013

(65) Prior Publication Data

US 2014/0192399 A1    Jul. 10, 2014

(51) Int. Cl.
G02B 26/00    (2006.01)
G02B 26/02    (2006.01)
G02B 5/18    (2006.01)
G02B 26/08    (2006.01)

(52) U.S. Cl.
CPC ................. G02B 26/0833 (2013.01)
USPC ........... 359/291; 359/290; 359/295; 359/230; 359/231; 359/572; 359/279; 359/559

(58) Field of Classification Search
CPC ............. G02B 26/08; G02B 26/0833; G02B 26/0816; G02B 26/0841; G02B 26/0808; G02B 5/1828

USPC ......... 359/290–295, 298, 230, 279, 558, 559, 359/572, 573, 850; 347/239; 438/65; 348/E5.142

See application file for complete search history.

(56) References Cited

U.S. PATENT DOCUMENTS

| 4,571,603 | A  | * | 2/1986  | Hornbeck et al. | ........... 347/239 |
| 5,311,360 | A  |   | 5/1994  | Bloom et al.    |                     |
| 5,459,610 | A  |   | 10/1995 | Bloom et al.    |                     |
| 5,661,592 | A  |   | 8/1997  | Bornstein et al.|                     |
| 5,677,783 | A  |   | 10/1997 | Bloom et al.    |                     |
| 6,243,194 | B1 | * | 6/2001  | Brazas et al.   | ................ 359/290 |
| 6,624,549 | B2 | * | 9/2003  | Takeuchi et al. | ............... 310/330 |
| 6,661,561 | B2 |   | 12/2003 | Fitzpatrick et al. |                 |
| 6,836,352 | B2 |   | 12/2004 | Fitzpatrick et al. |                 |
| 6,856,448 | B2 |   | 2/2005  | Fitzpatrick     |                     |
| 6,977,765 | B1 | * | 12/2005 | Yeo             | ............................. 359/291 |
| 7,054,051 | B1 | * | 5/2006  | Bloom           | ......................... 359/276 |
| 7,123,129 | B1 | * | 10/2006 | Schrott et al.  | ................ 340/10.1 |
| 7,193,766 | B2 | * | 3/2007  | Bloom           | ......................... 359/279 |
| 7,436,572 | B2 | * | 10/2008 | Huibers et al.  | ................ 359/291 |

* cited by examiner

Primary Examiner — Loha Ben
(74) Attorney, Agent, or Firm — Nelson Adrian Blish

(57) ABSTRACT

A system for modulating light using a micro-electro-mechanical structure includes a plurality of deformable mirror elements (30) having an L-shaped cross section. Each of the deformable mirror elements is comprised of a pedestal (32) and an elongated ribbon (33). Each of the ribbons has a reflective surface (35). A beam of light is directed on the deformable mirror elements. The deformable mirror elements is flexed about an axis parallel to a long dimension of the ribbons to vary a curvature of at least one of the reflective ribbons.

12 Claims, 6 Drawing Sheets

ASYMMETRICAL DEFORMABLE DIFFRACTIVE GRATING MODULATOR

CROSS REFERENCE TO RELATED APPLICATIONS

Reference is made to commonly-assigned copending U.S. patent application Ser. No. 13/737,979, filed Jan. 10, 2013, entitled ASYMMETRICAL DEFORMABLE DIFFRACTIVE GRATING MODULATOR; by Nissim Pilossof; the disclosure of which is incorporated herein.

FIELD OF THE INVENTION

The present invention relates in general to micro-mechanical structures and in particular to diffractive grating modulators.

BACKGROUND OF THE INVENTION

Micro-electro-mechanical systems (MEMS) are used in many devices which require modulation of light. For example, projectors may use a digital micromirror device (DMD), which has thousands of micromirrors. A cantilever or hinged mirror 10 of this type, shown in FIG. 1, rotates on an axis 11 reflect a beam of light when in an on position. A disadvantage of this type of device is the relatively slow response time, ~10 μs, due to the low natural frequency of each single hinged mirror.

In another type of modulation device, the deformable diffractive grating light modulation systems, the diffractive element is formed as a long narrow ribbon. In one design, the ribbon bends along the long axis of the ribbon thus forming a "piston" type switching diffractive element. Typical piston type diffractive elements are shown in U.S. Pat. Nos. 5,311,360; 5,459,610; and 5,677,783.

In another design, shown in FIG. 2a, the cross section of the diffractive ribbon is T-shaped and the ribbon bends along its short axis. FIG. 2a illustrates two pixel elements 21 and 22 of a spatial light modulator (SLM) 20 built on a silicon substrate 23, with each pixel comprised of three diffractive elements 210 and 220, respectfully. The pixels are driven using electrodes 24. Pixel 21 is shown in energized state while pixel 22 is in a non-energized state. Resulting diffraction distribution of the two pixels is shown on FIG. 2b. In energized (diffracting) state, a pixel produces symmetrical angular distribution of light intensity consisting of many diffraction maximums. T-shaped ribbon types of diffractive elements are shown, for example, in U.S. Pat. Nos. 6,661,561; 6,836,352; and 6,856,448.

Both types of diffractive elements have some advantages, while suffering from some drawbacks. In both types, however, the width of one ribbon, the pitch, determines the grating period d, and the diffracted light is distributed within multiple diffractive orders symmetrically in both directions. See FIG. 2b. The diffraction efficiency of a single element is very low with typical contrast of about 50%. Therefore, in optical systems using deformable ribbons light modulators, more than one ribbon is used for forming an optical pixel, rendering the minimum optical pixel size to two times the grating period or 2d.

SUMMARY OF THE INVENTION

Briefly, according to one aspect of the present invention a system for modulating light using a micro-electro-mechanical structure includes a plurality of deformable mirror elements having an L-shaped cross section. Each of the deformable mirror elements is comprised of a pedestal and an elongated ribbon. Each of the ribbons has a reflective surface. A beam of light is directed on the deformable mirror elements. The deformable mirror elements is flexed about an axis parallel to a long dimension of the ribbons to vary a curvature of at least one of the reflective ribbons.

The invention and its objects and advantages will become more apparent in the detailed description of the preferred embodiment presented below.

DETAILED DESCRIPTION OF THE INVENTION

The present invention will be directed in particular to elements forming part of, or in cooperation more directly with the apparatus in accordance with the present invention. It is to be understood that elements not specifically shown or described may take various forms well known to those skilled in the art.

Figure 1:
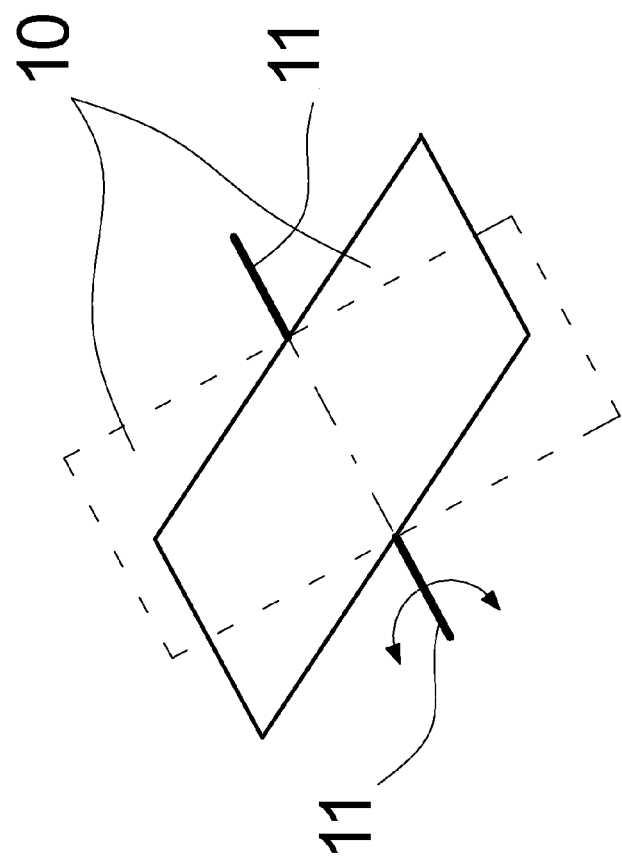
FIG. 1 shows a prior art cantilever mirror.
Figure 2A:
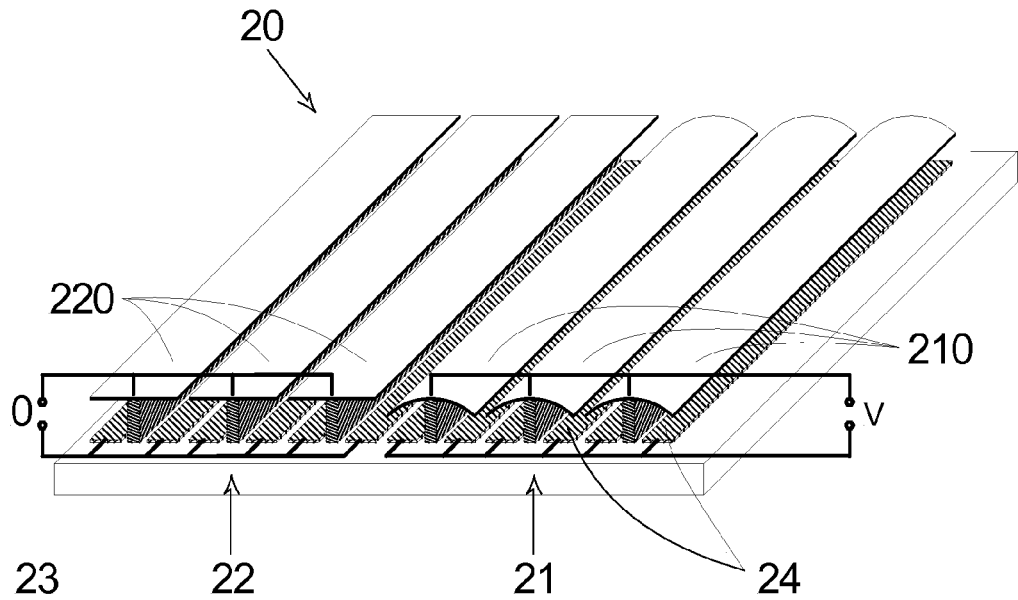
FIGS. 2a and 2b show a prior art SLM based on T-shaped ribbons and corresponding angular distribution of light intensity.
Figure 2B:
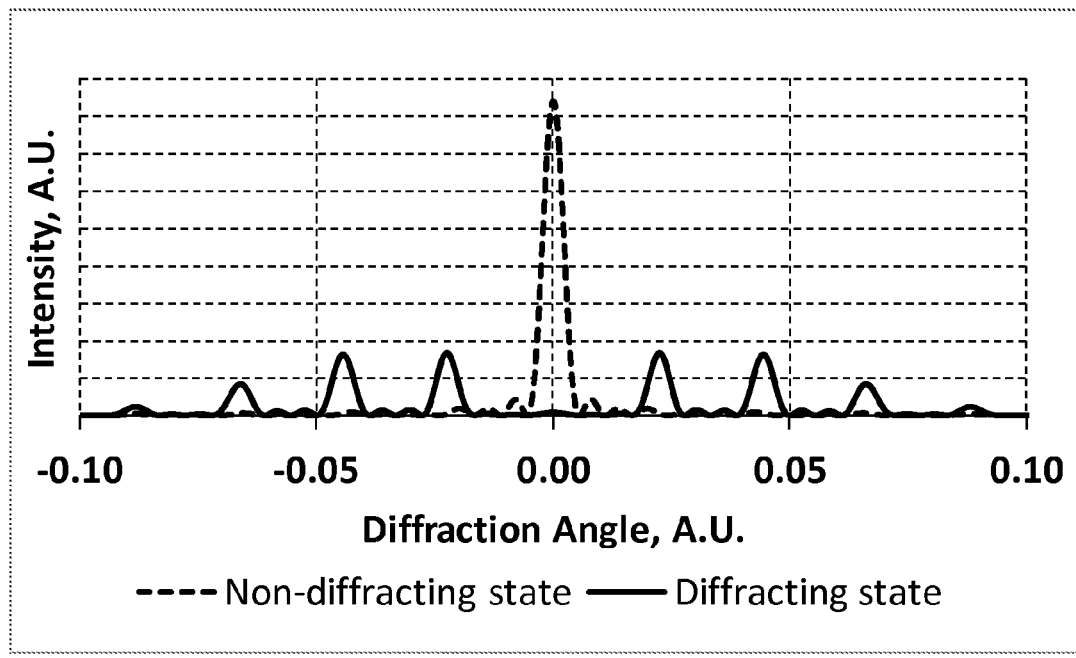
Figure 3:
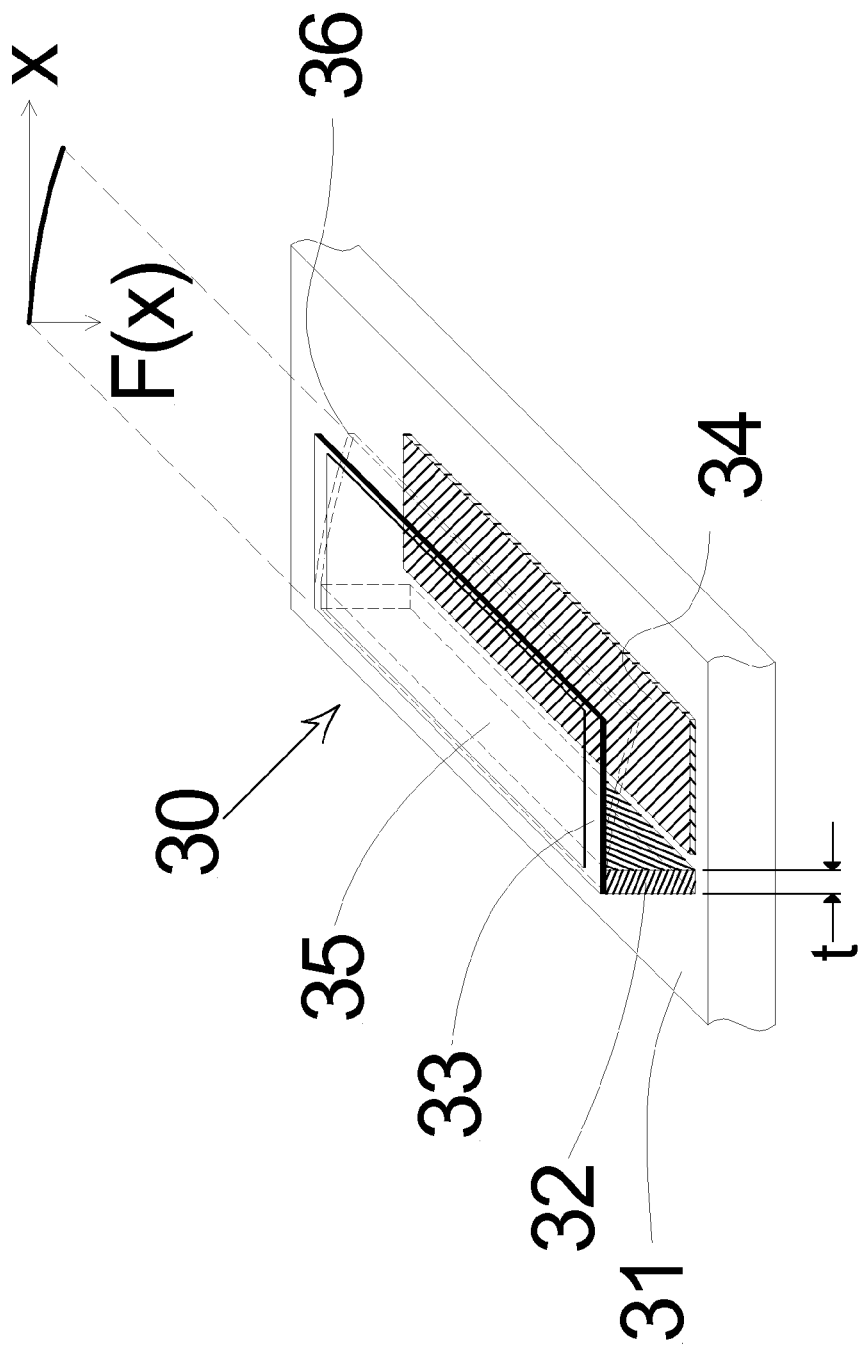
FIG. 3 shows an L-shaped ribbon according to the present invention.

One embodiment of the present invention is a diffractive grating consisting of mirrors shaped as ribbons with asymmetrical cross-section as shown in FIG. 3. The single diffractive element 30 will have approximately the same diffraction efficiency as symmetrical ribbons, but at half the pitch value, allowing for two times higher system resolution, all other optical conditions being equal. Fabrication methods for deformable mirrors is not within the scope of the present invention, but it is well known and described in details in U.S. Pat. Nos. 5,311,360 and 5,661,592 and can be adapted to fabrication of the mirrors of the present invention.

Referring again to FIG. 3, the deformable mirror element 30 is fabricated for example on a silicon substrate 31. A deformable mirror element 30 is comprised of a pedestal 32 which supports elongated ribbon 33. Either the pedestal 32 or the ribbon 33 or both are made electrically insulating material. The ribbon 33 has an unsupported elongated portion laterally extending along the pedestal 32. The surface of the ribbon 33 is coated with a highly reflective layer forming a mirror surface 35. For clarity the mirror is shown smaller than the ribbon width, but it is appreciated that it should cover whole width of the ribbon.

The choice of the coating material depends on the wavelength of light the SLM is intended to work with. For example SLM intended to work with visible light may be coated with aluminum while SLM intended to work with near infrared light may be coated with gold. In an embodiment wherein the ribbon is made of electrically insulating material like silicon nitride and the reflective coating is not electrically conductive, a special conductive coating beneath the reflective coating should be considered. Thus, in FIG. 3 element 35 represents an electrical electrode and reflective coating at the same time.

A second electrode 34 is formed on the surface of the substrate. Applying voltage between electrodes 34 and 35 energizes the ribbon and due to electrostatic forces, it bends along its shorter axis assuming position 36. When the ribbon is bent, its surface profile in the shorter direction (X-direction in FIG. 3) follows a profile function F(x). F(x) is taken into account when calculating the light intensity versus angle in diffracting state and depends on the dimensions of the ribbon, the mechanical properties of the material it builds from, and the applied voltage. Methods of calculating F(x) and the intensity angular distribution in diffracting state are well known in the art. Generally, the closer F(x) is to a straight line, the higher contrast ratio the SLM can achieve. Therefore it is desirable to have the thickness t of the post 32 as small as possible.

It is appreciated that the above discussed way of selecting and energizing a ribbon by means of electrostatic forces is only exemplary. Other methods like magnetic, thermal, etc. can also be used.

Figure 4:
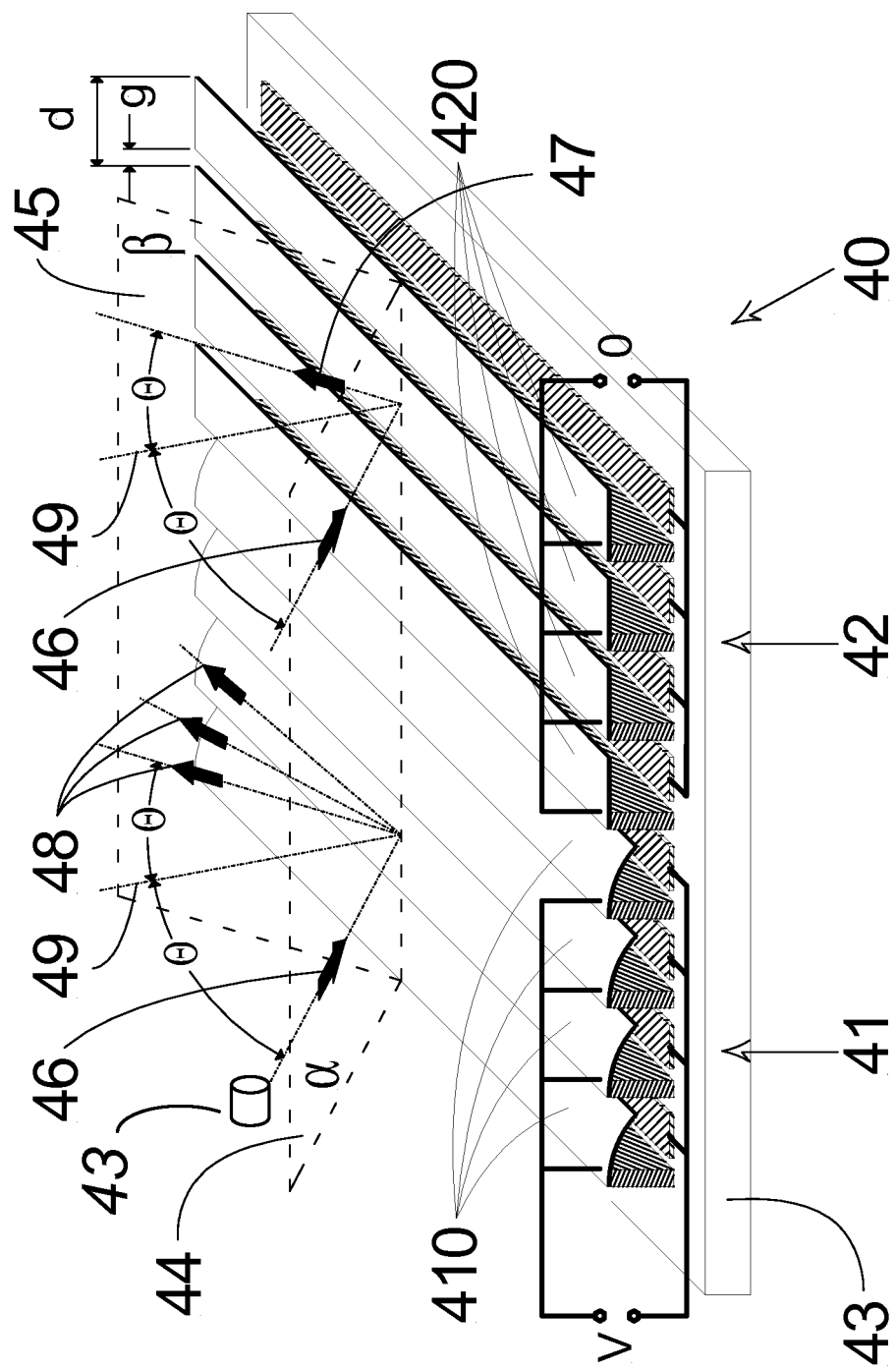
FIG. 4 is a cross-sectional view of a plurality of diffractive elements according to the present invention.

Reference is now made to FIG. 4 which shows a portion of SLM 40 with L-shaped deformable ribbons. The number of ribbons in a SLM can be hundreds or even thousands. The distance d between the ribbons is called the grating constant and determines the diffracting power of the device, while the ratio d/g, wherein g is the gap between the ribbons, is called the fill factor and affects the overall efficiency of the device. The higher the fill factor, the higher the device efficiency.

It is well known in the art that the diffraction efficiency depends on the number of individual elements contributing to the process. If a single pixel is formed from only one diffracting element the maximum achievable contrast is about 50%, which is not enough for most applications. Therefore, individual pixels are usually formed from two or more diffracting elements. It is appreciated that the simultaneous wiring of four ribbons illustrated in FIG. 4 is only exemplary. The SLM can be built by pre-wiring groups of ribbons to form a pixel (as illustrated in FIG. 4) or by wiring each individual ribbon and later forming pixels by simultaneous addressing of adjacent ribbons by the SLM driving electronics.

For simplicity, FIG. 4 illustrates only two pixel elements 41 and 42 and each pixel element consists of four ribbons (diffracting elements) 410 and 420 respectfully. Pixel 41 is in diffracting state and pixel 42 is in non-diffracting state. The incident light beam 46 from light source 43 lies in a plane at incidence angle α 44 and strikes the SLM plane at angle Θ relative to its normal 49. The light falling at the non-energized (inactive) pixel element 42 will experience a simple reflection 47 and will propagate in the plane of reflection β 45 at angle Θ relative to the SLM 40 plane normal 49. Light falling on the energized (active) pixel after reflection will propagate in different directions 48 governed by the laws of diffraction. Different directions of propagations constitute different diffraction orders as only one order, called "Zero order," will propagate in the plane of reflection 45 at angle Θ relative to the SLM 40 plane normal 49, i.e. will obey the law of simple reflection. All other orders first, second, etc. will generally propagate in different planes and at different angles relative to the plane normal 49.

Figure 5:
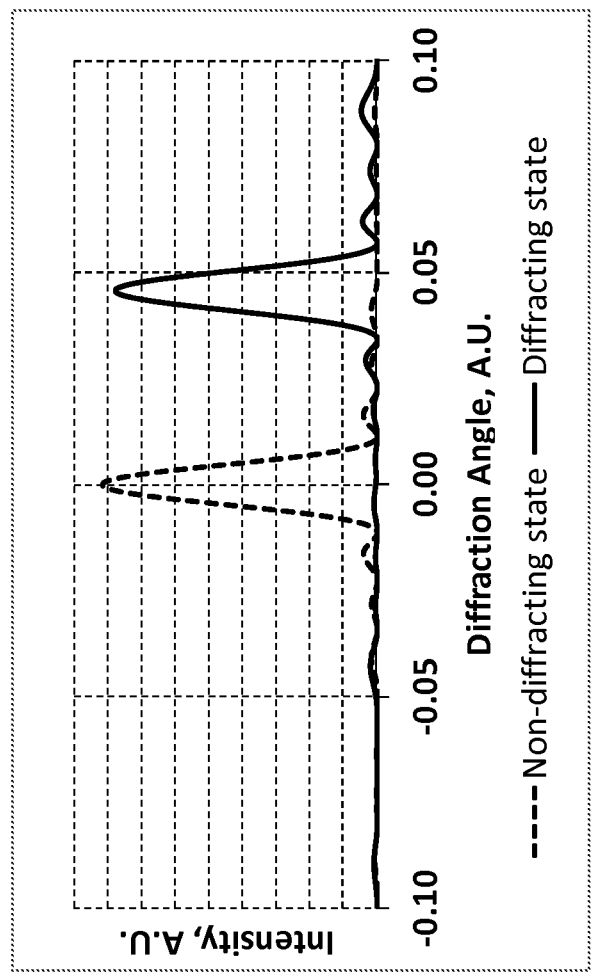
FIG. 5 shows intensity versus diffraction for L-shaped ribbons based SLM according to the present invention.

For specific profile function F(x) the angle of incidence Θ can be chosen in a way that the light propagating in Zero order direction is minimized and the diffracted light is concentrated predominantly in one of the higher diffracting orders first, second, etc. FIG. 5 illustrates such optimized angular distribution of light for pixels in diffracting and non-diffracting states. It can be seen that the diffracted light is concentrated predominantly in one diffraction maximum at one side of the grating, i.e. the grating is "blazed." This "blazing" property of the grating means that the diffracted light will be with approximately the same brightness as the non-diffracted.

Figure 6:
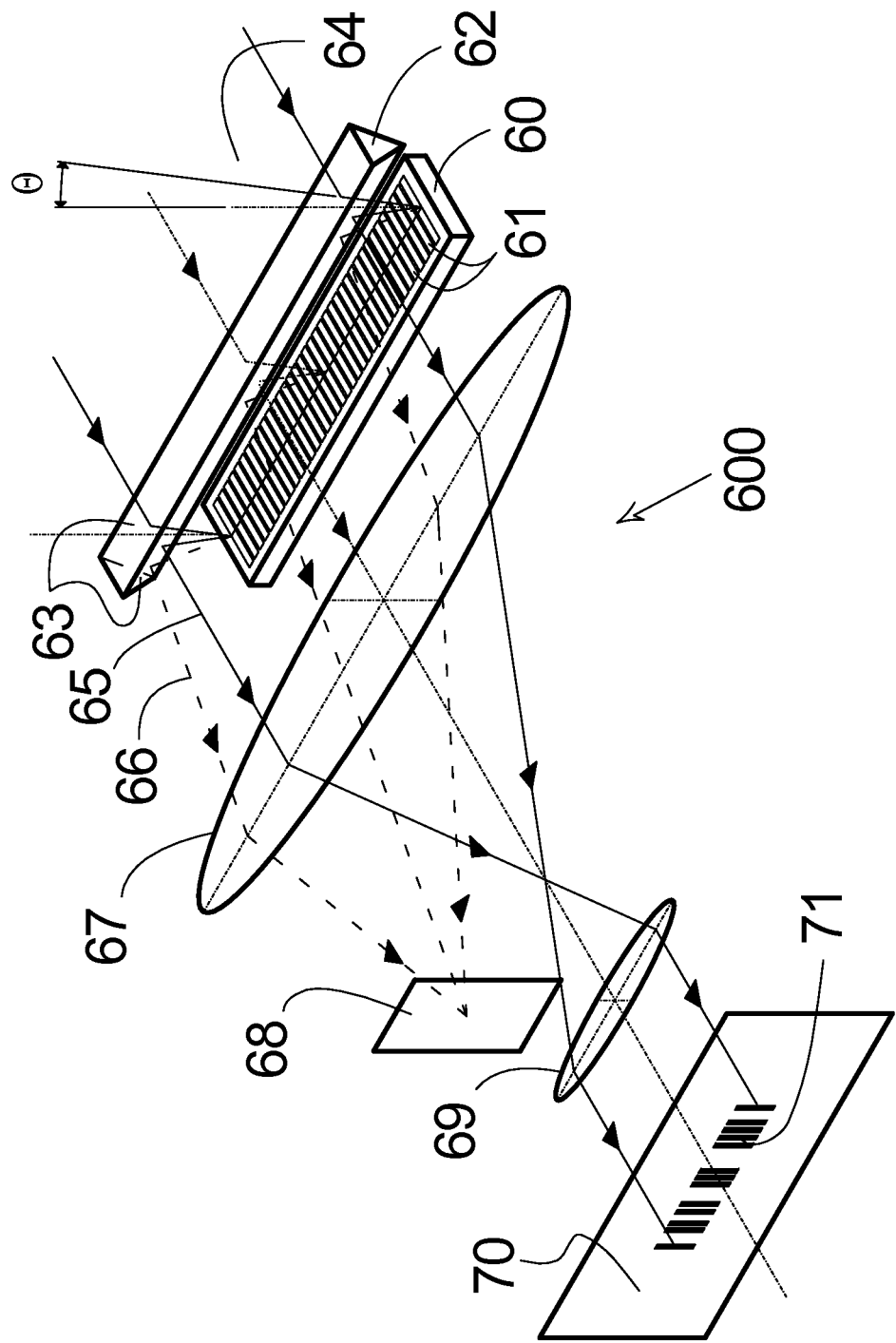
FIG. 6 is a schematic view of an optical system according to the present invention.

The angular modulation of the light achieved by the SLM can be converted into spatial modulation. This is explained with the help of FIG. 6. In an exemplary optical system 600, a SLM 60 with pixel elements built and arranged as described above and shown in FIGS. 3-5 is illuminated with beam of light 64 using a prism 62 with two reflective surfaces 63. It is appreciated that instead of a prism, a system of mirrors and direct illumination can be used. The illumination angle Θ is the same angle discussed above. After reflecting from the SLM, the light propagates within two beams 65 and 66. Beam 65 originates from non-energized pixels while beam 66 originates from energized pictures. Element 61 is a diffractive element.

Beams 65 and 66 pass through lens 67 the focal plane (the system's Fourier plane) contains a blocker 68 which stops the light from beam 66. After the blocker 68, only light from non-energized pixel element will propagate through the rest of the optical system, i.e. only the Zero diffraction order will be allowed.

The next element downstream is lens or group of lenses 69 which together with lens 67 constitute an imaging system with object plane the SLM and image plane 70, i.e. the SLM and plane 70 are conjugate. As all light from energized pixels will be stopped at the blocker 68 and the image 71 will contain only images of non-energized pixels. It is appreciated that it is possible to place the blocker 68 in such a way that it will stop the Zero Order and allow the higher diffractive orders. In such case the image plane will contain images of all energized pixels.

The invention has been described in detail with particular reference to certain preferred embodiments thereof, but it will be understood that variations and modifications can be effected within the scope of the invention.

PARTS LIST

10 hinged mirror
11 axis
20 spatial light modulator (SLM)
21 pixel element
22 pixel element
23 substrate
24 electrode
30 deformable mirror element
31 substrate
32 pedestal
33 ribbon
34 electrode
35 mirror surface
36 axis assuming position
40 spatial light modulator (SLM)
41 pixel element
42 pixel element
43 light source
44 incidence angle α
45 reflection β
46 incident light beam
47 reflection
48 direction
49 plane normal
60 spatial light modulator (SLM)
61 ribbon (diffractive element)
62 prism
63 reflective surface
64 beam of light 65 beam
66 beam
67 lens
68 blacker
69 group of lenses
70 image plane
71 image
210 diffractive element
220 diffractive element
410 ribbon (diffracting element)
420 ribbon (diffracting element)
600 optical system

The invention claimed is:

1. A system for modulating light using a micro-electro-mechanical structure comprising:
   a plurality of deformable mirror elements having an L-shaped cross section;
   wherein each of said deformable mirror elements is comprised of a pedestal and an elongated ribbon;
   a reflective surface on each of said ribbons; and
   a light source;
   wherein each of said deformable mirror elements flexes about an axis parallel to a long dimension of each ribbon to vary a curvature of at least one of the reflective ribbons and deflect a beam of light from said light source.

2. The system of claim 1 wherein said reflective surface has one or more reflective segments.

3. The system of claim 1 wherein each of said deformable mirror elements flexes independently.

4. The system of claim 1 wherein each of the pedestals is anchored to a substrate parallel to each adjacent pedestal.

5. The system of claim 1 further comprising:
   an activation device on each of said ribbons.

6. The system of claim 5 wherein said activation device induces curvature in a pixel group of said ribbons.

7. The system of claim 5 further comprising:
   a complimentary activation devices on a substrate that anchors the pedestal on each of said deformable mirror elements;
   wherein said complimentary activation device induces curvature in said ribbons.

8. The system of claim 5 wherein said activation device is selected from a group comprising electrical, magnetic, or heating elements.

9. The system of claim 1 wherein the reflective surface is conductive.

10. The system of claim 1 wherein said reflective surface is matched to a wavelength of the light.

11. The system of claim 1 wherein the reflective surface is aluminum and a wavelength of the light is in the visible range.

12. The system of claim 1 wherein the reflective surface is gold and a wavelength of the light is in the infrared range.

* * * * *